US010972368B2

(12) United States Patent
Sapra et al.

(10) Patent No.: US 10,972,368 B2
(45) Date of Patent: Apr. 6, 2021

(54) METHODS, SYSTEMS, AND COMPUTER READABLE MEDIA FOR PROVIDING REDUCED SIGNALING INTERNET OF THINGS (IOT) DEVICE MONITORING

(71) Applicant: Oracle International Corporation, Redwood Shores, CA (US)

(72) Inventors: Kawal Sapra, Bangalore (IN); Abhishek Mukherjee, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/415,758

(22) Filed: May 17, 2019

(65) Prior Publication Data
US 2020/0366577 A1    Nov. 19, 2020

(51) Int. Cl.
*G06F 15/16* (2006.01)
*H04L 12/26* (2006.01)
(Continued)

(52) U.S. Cl.
CPC ............ *H04L 43/028* (2013.01); *H04L 67/12* (2013.01); *H04L 67/26* (2013.01); *H04W 8/04* (2013.01); *H04W 64/003* (2013.01)

(58) Field of Classification Search
CPC ....... H04L 43/028; H04L 67/12; H04L 67/26; H04W 8/04; H04W 64/003; H04W 4/70; H04W 8/18
(Continued)

(56) References Cited

U.S. PATENT DOCUMENTS 6,119,000 A    9/2000 Stephenson et al.
7,535,915 B2 *    5/2009 Collins ............. H04L 29/06027
                                                                370/410
(Continued)

FOREIGN PATENT DOCUMENTS

WO    WO 2020/171899 A1    8/2020
WO    WO 2020/176172 A1    9/2020
WO    WO 2020/210026 A1    10/2020

OTHER PUBLICATIONS

"TSP Interface Protocol Between the MTC Internetworking Function (MTC-IWF) and Service Capability Server (SCS)," 3GPP TS 29.368, ETSI TS 129 368 (UMTS and LTE), V. 15.0.0, Jul. 2018. (Year: 2018).*

(Continued)

*Primary Examiner* — Melvin H Pollack
(74) *Attorney, Agent, or Firm* — Jenkins, Wilson, Taylor & Hunt, P.A.

(57) ABSTRACT

A method for providing reduced signaling Internet of things (IoT) device monitoring includes steps performed in a combined and service capability exposure function (SCEF) and Diameter signaling router (DSR) including at least one processor. The method includes receiving Diameter signaling containing IoT device information. The method further includes using the IoT device information to automatically provision an IoT device information database. The method further includes receiving a monitoring subscription request. The method further includes extracting the IoT device information from the IoT device information database. The method further includes using the IoT device information to respond to the monitoring subscription request.

18 Claims, 7 Drawing Sheets

(51) Int. Cl.
*H04W 8/04* (2009.01)
*H04L 29/08* (2006.01)
*H04W 64/00* (2009.01)

(58) Field of Classification Search
USPC .......................................................... 709/224
See application file for complete search history.

(56) References Cited

U.S. PATENT DOCUMENTS

| | | | |
|---|---|---|---|
| 8,023,482 B2 | 9/2011 | Gong et al. | |
| 9,730,156 B1* | 8/2017 | Chamarty | H04W 60/04 |
| 9,781,259 B1 | 10/2017 | Kodaypak | |
| 9,893,939 B2* | 2/2018 | Kim | H04W 24/08 |
| 9,894,464 B2* | 2/2018 | Jain | H04W 4/70 |
| 9,948,646 B1* | 4/2018 | Lai | H04L 63/0884 |
| 10,104,567 B2* | 10/2018 | Kodaypak | H04L 12/2803 |
| 10,129,867 B2* | 11/2018 | Shaw | H04W 12/06 |
| 10,194,459 B2* | 1/2019 | Kim | H04W 72/1284 |
| 10,212,639 B2* | 2/2019 | Kodaypak | H04W 76/12 |
| 10,231,113 B1* | 3/2019 | Huang | H04W 4/08 |
| 10,313,914 B2* | 6/2019 | Huang | H04W 28/0221 |
| 10,375,530 B2 | 8/2019 | Buckley et al. | |
| 10,375,548 B2* | 8/2019 | Kodaypak | H04L 65/1016 |
| 10,448,243 B2* | 10/2019 | Tanna | H04W 4/14 |
| 10,470,077 B1* | 11/2019 | Kodaypak | H04W 4/14 |
| 10,517,138 B2* | 12/2019 | Starsinic | H04W 4/08 |
| 10,536,211 B2* | 1/2020 | Leroux | H04W 8/005 |
| 10,542,459 B2* | 1/2020 | Hua | H04W 8/26 |
| 10,548,000 B2* | 1/2020 | Jain | H04W 60/04 |
| 10,548,062 B2* | 1/2020 | Cui | H04W 40/248 |
| 10,555,202 B1 | 2/2020 | Narayanan et al. | |
| 10,575,278 B2* | 2/2020 | Kim | H04W 52/0209 |
| 10,581,623 B2* | 3/2020 | Lu | H04L 12/1407 |
| 10,588,085 B2* | 3/2020 | Kim | H04W 52/0251 |
| 10,595,268 B2* | 3/2020 | Lee | H04W 68/02 |
| 10,601,932 B2* | 3/2020 | Kodaypak | H04L 41/0803 |
| 10,602,322 B2* | 3/2020 | Palanisamy | H04W 4/70 |
| 10,602,441 B2* | 3/2020 | Palanisamy | H04W 4/70 |
| 10,609,154 B2* | 3/2020 | Talebi Fard | H04L 67/147 |
| 10,623,161 B2* | 4/2020 | Åstrom | H04W 72/10 |
| 10,631,266 B2* | 4/2020 | Park | H04W 60/00 |
| 10,652,085 B2* | 5/2020 | Ryu | H04L 41/0806 |
| 10,652,098 B2* | 5/2020 | Kim | H04L 41/12 |
| 10,742,744 B1 | 8/2020 | Mahalank et al. | |
| 10,791,508 B2* | 9/2020 | Park | H04W 48/18 |
| 10,805,036 B2* | 10/2020 | Ronneke | H04W 4/70 |
| 10,805,178 B2* | 10/2020 | Livanos | H04W 60/06 |
| 10,805,841 B2* | 10/2020 | Livanos | H04W 8/02 |
| 10,820,231 B2* | 10/2020 | Huang | H04W 28/0215 |
| 2004/0203744 A1 | 10/2004 | Hicks et al. | |
| 2008/0039132 A1 | 2/2008 | Delibie et al. | |
| 2010/0029301 A1 | 2/2010 | Pyo et al. | |
| 2010/0118847 A1 | 5/2010 | Lee et al. | |
| 2012/0320766 A1 | 12/2012 | Sridhar | |
| 2014/0189151 A1 | 7/2014 | Aviv et al. | |
| 2015/0016266 A1 | 1/2015 | Dumitrescu et al. | |
| 2015/0110000 A1 | 4/2015 | Zhang et al. | |
| 2015/0263987 A1 | 9/2015 | Klein et al. | |
| 2016/0164788 A1 | 6/2016 | Goel et al. | |
| 2016/0315743 A1 | 10/2016 | Nagaraj et al. | |
| 2016/0330647 A1* | 11/2016 | Iwai | H04L 12/1407 |
| 2016/0373591 A1 | 12/2016 | Sharma et al. | |
| 2017/0195822 A1 | 7/2017 | Watfa et al. | |
| 2017/0244629 A1 | 8/2017 | Kodaypak et al. | |
| 2017/0347283 A1 | 11/2017 | Kodaypak | |
| 2018/0035351 A1 | 2/2018 | Kodaypak | |
| 2018/0206093 A1* | 7/2018 | Jain | H04W 4/70 |
| 2018/0213391 A1* | 7/2018 | Inoue | H04W 8/10 |
| 2018/0249281 A1 | 8/2018 | McCann | |
| 2018/0263013 A1 | 9/2018 | Jain et al. | |
| 2018/0324671 A1* | 11/2018 | Palnati | H04W 8/26 |
| 2018/0332462 A1* | 11/2018 | Kim | H04W 28/02 |
| 2018/0376417 A1 | 12/2018 | Wang | |
| 2019/0007329 A1 | 1/2019 | Velev et al. | |
| 2019/0028337 A1* | 1/2019 | Ryu | H04W 4/70 |
| 2019/0037441 A1* | 1/2019 | Liu | H04W 4/70 |
| 2019/0069211 A1* | 2/2019 | Ronneke | H04W 4/70 |
| 2019/0069221 A1* | 2/2019 | Virgile | H04W 88/16 |
| 2019/0141527 A1 | 5/2019 | Krishan | |
| 2019/0191274 A1 | 6/2019 | Fontaine | |
| 2019/0230492 A1* | 7/2019 | Suzuki | H04W 88/18 |
| 2019/0238425 A1* | 8/2019 | Mladin | H04L 41/5048 |
| 2019/0253875 A1* | 8/2019 | Vittal | H04L 61/3075 |
| 2019/0306251 A1 | 10/2019 | Talebi Fard et al. | |
| 2019/0349426 A1* | 11/2019 | Smith | H04L 67/104 |
| 2019/0387460 A1* | 12/2019 | Jonnala | H04W 48/16 |
| 2020/0021953 A1 | 1/2020 | Mahalank | |
| 2020/0028973 A1 | 1/2020 | Livanos et al. | |
| 2020/0037203 A1* | 1/2020 | Ianev | H04W 28/06 |
| 2020/0037226 A1* | 1/2020 | Magadevan | H04W 4/027 |
| 2020/0053628 A1* | 2/2020 | Wang | H04L 45/00 |
| 2020/0053686 A1* | 2/2020 | Edge | H04W 52/0251 |
| 2020/0053802 A1* | 2/2020 | Li | H04L 41/5041 |
| 2020/0059927 A1* | 2/2020 | Sun | H04J 3/1694 |
| 2020/0068047 A1* | 2/2020 | Huang | H04L 67/141 |
| 2020/0068626 A1* | 2/2020 | Cakulev | H04W 4/70 |
| 2020/0077253 A1* | 3/2020 | Kim | H04W 8/08 |
| 2020/0077361 A1* | 3/2020 | Huang | H04W 68/02 |
| 2020/0084277 A1 | 3/2020 | Somaraju | |
| 2020/0084677 A1* | 3/2020 | Yiu | H04W 76/27 |
| 2020/0092706 A1* | 3/2020 | Kawasaki | H04W 8/24 |
| 2020/0100080 A1* | 3/2020 | Mladin | H04W 4/50 |
| 2020/0100088 A1* | 3/2020 | Kim | H04W 8/005 |
| 2020/0100291 A1* | 3/2020 | Ravishankar | H04W 72/04 |
| 2020/0106695 A1* | 4/2020 | Rk | H04L 67/1097 |
| 2020/0120475 A1* | 4/2020 | Gupta | H04W 60/00 |
| 2020/0120478 A1* | 4/2020 | Kim | H04W 52/0216 |
| 2020/0128566 A1* | 4/2020 | Wei | H04W 72/0446 |
| 2020/0137675 A1* | 4/2020 | Park | H04W 80/10 |
| 2020/0145309 A1* | 5/2020 | Soderlund | H04L 12/4633 |
| 2020/0146077 A1* | 5/2020 | Li | H04W 76/10 |
| 2020/0229265 A1* | 7/2020 | Wang | H04L 1/0003 |
| 2020/0275257 A1 | 8/2020 | Gupta et al. | |
| 2020/0296665 A1* | 9/2020 | Huang | H04W 4/70 |
| 2020/0314760 A1* | 10/2020 | Ye | H04W 74/0833 |
| 2020/0322884 A1 | 10/2020 | Di Girolamo et al. | |
| 2020/0344576 A1* | 10/2020 | Li | H04W 4/06 |

OTHER PUBLICATIONS

R. Ratasuk, N. Mangalvedhe and A. Ghosh, "Overview of LTE enhancements for cellular IoT," 2015 IEEE 26th Annual International Symposium on Personal, Indoor, and Mobile Radio Communications (PIMRC), Hong Kong, 2015, pp. 2293-2297, doi: 10.1109/PIMRC.2015.7343680. (Year: 2015).*

N. Kouzayha, M. Jaber and Z. Dawy, "Measurement-Based Signaling Management Strategies for Cellular IoT," in IEEE Internet of Things Journal, vol. 4, No. 5, pp. 1434-1444, Oct. 2017, doi: 10.1109/JIOT.2017.2736528. (Year: 2017).*

A. Hoglund et al., "Overview of 3GPP Release 14 Enhanced NB-IoT," in IEEE Network, vol. 31, No. 6, pp. 16-22, Nov./Dec. 2017, doi: 10.1109/MNET.2017.1700082. (Year: 2017).*

V. P. Kafle, Y. Fukushima, P. Martinez-Julia and H. Harai, "Scalable Directory Service for IoT Applications," in IEEE Communications Standards Magazine, vol. 1, No. 3, pp. 58-65, Sep. 2017, doi: 10.1109/MCOMSTD.2017.1700027. (Year: 2017).*

Y. Yu, "The Mobile Network Capability Exposure Friendly to the Mobile Internet Applications," 2017 IEEE Wireless Communications and Networking Conference (WCNC), San Francisco, CA, 2017, pp. 1-6, doi: 10.1109/WCNC.2017.7925816. (Year: 2017).*

H. Hawilo, A. Shami, M. Mirahmadi and R. Asal, "NFV: state of the art, challenges, and implementation in next generation mobile networks (vEPC)," in IEEE Network, vol. 28, No. 6, pp. 18-26, Nov.-Dec. 2014, doi: 10.1109/MNET.2014.6963800. (Year: 2014).*

Gilles Bertrand, "The IP Multimedia Subsystem in Next Generation Networks" Network, Multimedia and Security department (RSM), May 30, 2007 (Year: 2007).*

S. M. Faccin, P. Lalwaney and B. Patil, "IP multimedia services: analysis of mobile IP and SIP interactions in 3G networks," in IEEE

(56) References Cited

OTHER PUBLICATIONS

Communications Magazine, vol. 42, No. 1, pp. 113-120, Jan. 2004, doi: 10.1109/MCOM.2004.1262170. (Year: 2004).*
L. Le and G. Li, "Cross-Layer Mobility Management based on Mobile IP and SIP in IMS," 2007 International Conference on Wireless Communications, Networking and Mobile Computing, Shanghai, 2007, pp. 803-806, doi: 10.1109/WICOM.2007.207. (Year: 2007).*
Commonly-assigned, co-pending U.S. Appl. No. 16/453,955 for "Methods, Systems, And Computer Readable Media for Producer Network Function (NF) Service Instance Wide Egress Rate Limiting at Service Communication Proxy (SCP)," (Unpublished, filed Jun. 26, 2019).
"Class of Service Feature Guide (Routers and EX9200 Switches)", Junos OS, Juniper Networks, pp. 1-1530 (Apr. 10, 2019).
"3rd Generation Partnership Project; Technical Specification Group Services and System Aspects; System Architecture and 5G; Stage 2 (Release 16)", 3GPP TS 23.501, V16.0.0, pp. 1-318 (Mar. 2019).
"Oracle Communication Diameter Signaling Router", Release Notice, Release 8.3, E93179 Revision 02, Oracle, pp. 1-98 (Dec. 2018).
"Addressing 5G Network Functio Requirements", Intel FPGAs and Intel PAC 5G Qos and IPSec Benchmarking, White Paper, pp. 1-8 (Oct. 2018).
5G; 5G System; Technical Realization of Service Based Architecture; Stage 3 (3GPP TS 29.500 version 15.0.0 Release 15) ETSI TS 129 500 V15.0.0, pp. 1-29 (Jul. 2018).
Benacer et al., "A High-Speed Traffic Manager Architecture for Flow-Based Networking", pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements", European Commission, 5G-XHaul, pp. 1-107 (Jun. 31, 2016).
Commonly-assigned, co-pending U.S. Appl. No. 16/399,428 for "Methods, Systems, and Computer Readable Media for Monitoring Lightweight Machine to Machine (LWM2M) Internet of Things (IoT) Devices Through Service Capability Exposure Function (SCEF) T8 Interface," (Unpublished, filed April 30, 2019).
"3rd Generation Partnership Project; Technical Specification Group Core Network and Terminals; Home Subscriber Server (HSS) diameter interfaces for interworking with packet data networks and applications (Release 15)," 3GPP TS 29.336, V15.6.0, pp. 1-79 (Mar. 2019).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).
"3rd Generation Partnership Project; Technical Specification Group Services and System Aspects; Architecture enhancements to facilitate communications with packet data networks and applications (Release 16)," 3GPP TS 23.682, V16.2.0, pp. 1-126 (Mar. 2019).
"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).
Commonly-assigned, co-pending U.S. Appl. No. 16/287,808 for "Methods, Systems, and Computer Readable Media for Dynamically Provisioning and Using Public Land Mobile Network (PLMN) Location Mappings in Service Capability Exposure Function (SCEF) or Network Exposure Function (NEF)," (Unpublished, filed Feb. 27, 2019).
Commonly-assigned, co-pending U.S. Appl. No. 16/280,672 for Methods, Systems, And Computer Readable Media for (IoT) Device State Through Service Capability Exposure Function (SCEF) (Unpublished, filed Feb. 20, 2019).
"OMA Lightweight Machine to Machine Requirements," Candidate Version 1.2, Open Mobile Alliance, pp. 1-20 (Jan. 24, 2019).

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.4.0, pp. 1-383 (Dec. 2018).
"3rd Generation Partnership Project; Technical Specification Group Core Network and Terminals; Home Subscriber Server (HSS) diameter interfaces for interworking with packet data networks and applications (Release 15)," 3GPP TS 29.336, V15.5.0, pp. 1-74 (Dec. 2018).
"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).
"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).
"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).
"Diameter Signaling Router SCEF User's Guide," Release 8.3, E93572, Oracle® Communications, pp. 1-110 (Sep. 2018).
"3rd Generation Partnership Prject; Technical Specification Group Services and System Aspects; Universal Geographical Area Description (GAD) (Release 15)," 3GPP TS 23.032, pp. 1-32 (Sep. 2018).
"3rd Generation Partnership Project; Technical Specification Group Core Network and Terminals; Customised Applications for Mobile network Enhanced Logic (CAMEL) Phase 4; Stage 2 (Release 15)," 3GPP TS 23.078, V15.0.0, pp. 1-750 (Jun. 2018).
"Lightweight Machine to Machine Technical Specification: Transport Bindings," Candidate Version: 1.1, Open Mobile Alliance, pp. 1-67 (Jun. 12, 2018).
"Lightweight Machine to Machine Technical Specification: Core," Candidate Version: 1.1, Open Mobile Alliance, pp. 1-142 (Jun. 12, 2018).
Mayer, Georg (Huawei) "3GPP 5G CoreNetwork Status", 3GPP A Global Initiative, pp. 1-23 (Nov. 2017).
"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).
Bormann et al., "Block-Wise Transfers in the Constrained Application Protocol (CoAP)," RFC 7959, pp. 1-37 (Aug. 2016).
Hartke, "Observing Resources in the Constrained Application Protocol (CoAP)," RFC 7641, pp. 1-30 (Sep. 2015).
Shelby et al., "The Constrained Application Protocol (CoAP)," RFC 7252, pp. 1-112 (Jun. 2014).
Notice of Allowance and Fee(s) Due for U.S. Appl. No. 16/280,672 (Sep. 25, 2019).
"3rd Generation Partnership Project; Technical Specification Group Services and System Aspects; Architecture enhancements to facilitate communications with packet data networks and applications (Release 16)," 3GPP TS 23.682, V16.1.0, pp. 1-126 (Dec. 2018).
Notification of Transmittal of the International Search Report and the Written Opinion of the International Searching Authority, or the Declaration for International Application Serial No. PCT/US2020/024518 (dated Jul. 10, 2020).
Non-Final Office Action for U.S. Appl. No. 16/287,808 (dated Jun. 16, 2020).
Notification of Transmittal of the International Search Report and the Written Opinion of the International Searching Authority, or the Declaration for International Application Serial No. PCT/US2020/013960 (dated Apr. 20, 2020).
Notice of Allowance and Fee(s) Due for U.S. Appl. No. 16/399,428 (dated Apr. 6, 2020).
Notification of Transmittal of the International Search Report and the Written Opinion of the International Searching Authority, or the Declaration for International Application Serial No. PCT/US2020/013961 (dated Mar. 31, 2020).

(56) References Cited

OTHER PUBLICATIONS

"Lightweight Machine to Machine Technical Specification: Transport Bindings," Approved Version: 1.1, Open Mobile Alliance, pp. 1-68 (Aug. 6, 2018).
"3rd Generation Partnership Project; Technical Specification Group Radio Access Network; Evolved Universal Terrestrial Radio Access Network (E-UTRAN); S1 signalling transport (Release 15)," 3GPP TS 36.412, V15.0.0, pp. 1-8 (Jun. 2018).
"3rd Generation Partnership Project; Technical Specification Group Services and System Aspects; Architecture enhancements to facilitate communications with packet data networks and applications (Release 13)," 3GPP TS 23.682, V13.6.0, pp. 1-91 (Jun. 2016).
"3rd Generation Partnership Project; Technical Specification Group Services and System Aspects; Architecture enhancements to facilitate communications with packet data networks and applications (Release 13)," 3GPP TS 23.682, V13.4.0, pp. 1-81 (Dec. 2015).
Zte, "Reporting the Number of UEs in Certain Geographic Area," SA WG2 Meeting #107, pp. 1-4 (Jan. 30, 2015).
Abdullah et al., "Femtocell Geo-location Challenge: DSL Approach as Solution," 2014 IEEE 5th Control and System Graduate Research Colloquium, pp. 239-241 (Aug. 11, 2014).
China Mobile, "Supporting legacy HLR in Architecture for MTC usage," SA WG2 Meeting #90, pp. 1-9 (Apr. 10, 2012).
Notice of Allowance and Fee(s) Due for U.S. Appl. No. 16/287,808 (dated Nov. 4, 2020).
Commonly-assigned, co-pending U.S. Appl. No. 16/932,226 for "Methods, Systems, and Computer Readable Media for Monitoring Machine Type Communications (MTC) Device Related Information," (Unpublished, filed Jul. 17, 2020).
"3rd Generation Partnership Project; Technical Specification Group Core Network and Terminals; Location Services (LCS); Diameter-based SLh interface for Control Plane LCS (Release 16)," 3GPP TS 29.173 V16.0.0, pp. 1-19 (Jul. 2020).
"3rd Generation Partnership Project; Technical Specification Group Services and System Aspects; Architecture enhancements to facilitate communications with packet data networks and applications (Release 16)," 3GPP TS 23.682 V16.7.0, pp. 1-134 (Jul. 2020).
"3rd Generation Partnership Project; Technical Specification Group Core Network and Terminals; Home Subscriber Server (HSS) diameter interfaces for interworking with packet data networks and applications (Release 16)," 3GPP TS 29.336 V16.2.0, pp. 1-79 (Jun. 2020).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272 V16.3.0, pp. 1-177 (Jun. 2020).
"3rd Generation Partnership Project; Technical Specification Group Core Network and Terminals; T8 reference point for Northbound APIs; (Release 16)," 3GPP TS 29.122 V16.6.0, pp. 1-360 (Jun. 2020).
"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.1.0, pp. 1-51 (Mar. 2020).
"Oracle® Communications Diameter Signaling Router Service Capability Exposure Function User's Guide," Release 8.4, F12301-02, Oracle, pp. 1-150 (Jan. 2020).
Fajardo et al., "Diameter Based Protocol," Internet Engineering Task Force (IETF) Request for Comments: 6733, pp. 1-152 (Oct. 2012).

\* cited by examiner

METHODS, SYSTEMS, AND COMPUTER READABLE MEDIA FOR PROVIDING REDUCED SIGNALING INTERNET OF THINGS (IOT) DEVICE MONITORING

TECHNICAL FIELD

The subject matter described herein relates to monitoring IoT devices. More particularly, the subject matter described herein relates to methods, systems, and computer readable media for providing reduced signaling IoT device monitoring.

BACKGROUND

The service capability exposure function (SCEF) is the 3GPP platform that enables IoT application servers to monitor IoT device state. The procedure for monitoring IoT devices is referred to as the 3GPP MTC monitoring event procedure and allows an IoT application server (AS) or service capability server/application server (SCS/AS) to monitor IoT device status and is described in Third Generation Partnership Project (3GPP) TS 23.682, Technical Specification Group Services and System Aspects; Architecture enhancements to communications with packet data networks and applications (Release 16), V16.2.0 (March 2019). The interface that an SCS or AS uses to invoke the 3GPP machine type communication (MTC) monitoring event procedure is referred to as the T8 interface, which is specified in 3GPP TS 29.122, Technical Specification Group Core Network and Terminals; T8 reference point for Northbound APIs; (Release 16) V16.1.0 (March 2019). The T8 interface is provided by the SCEF.

According to the 3GPP MTC monitoring event procedure, the IoT AS or SCS/AS sends a monitoring configuration (subscription) request to the SCEF over the T8 interface to monitor a specified IoT device parameter. The IoT AS can request continuous or one-time reporting of device status in the T8 monitoring configuration request to SCEF. The SCEF creates a monitoring context for a given monitoring configuration (subscription) request and assists in delivering the requested IoT device status. The SCEF retrieves the required device status information from evolved packet core (EPC) network elements, such as the home subscriber server (HSS), mobility management entity (MME), serving general packet radio service support node (SGSN), or policy and charging rules function (PCRF), and generates device status reports towards the IoT AS. The MTC monitoring event procedure supports monitoring of IoT device status information (i.e., monitoring events), such as location information, roaming status, device reachability, connectivity status, communication failure, etc., from the IoT AS through EPC network elements, such as the HSS, MME, SGSN, and PCRF.

The internet of things or IoT introduces connectivity to billions of IoT devices within an operator network, thereby increasing the traffic load in the 4G core network. The number of IoT devices has the potential to cause increased traffic congestion on core network nodes. For example, signaling traffic between the SCEF, the HSS, and the MME used to obtain IoT device state information can cause congestion at the SCEF, HSS, and MME nodes. One result of this congestion is that network operators must invest heavily in providing sufficient processing capacity at these nodes to handle the increased traffic load caused by IoT device monitoring traffic.

Accordingly, there exists a need for methods, systems, and computer readable media for providing reduced signaling IoT device monitoring.

SUMMARY

The subject matter described herein includes methods, systems, and computer readable media for providing for reduced signaling IoT device monitoring. One method for providing reduced signaling Internet of things (IoT) device monitoring includes steps performed in a combined SCEF and DSR including at least one processor. The method includes receiving Diameter signaling containing IoT device information. The method further includes using the IoT device information to automatically provision an IoT device information database. The method further includes receiving a monitoring subscription request. The method further includes extracting the IoT device information from the IoT device information database. The method further includes using the IoT device information to respond to the monitoring subscription request.

According to one aspect of the subject matter described herein, receiving Diameter signaling includes receiving a Diameter signaling message transmitted between a mobility management entity/serving general packet radio service report node (MME/SGSN) and a home subscriber server (HSS) separately from monitoring event signaling.

According to another aspect of the subject matter described herein, the Diameter signaling message comprises a purge UE request (PUR) and the IoT device information comprises loss of device connectivity.

According to yet another aspect of the subject matter described herein, the Diameter signaling message comprise a notification answer (NOA) message and the IoT device information comprise device reachability.

According to yet another aspect of the subject matter described herein, the Diameter signaling message comprises an update location request (ULR) or an insert subscriber data answer (IDA) and the IoT device information comprises device location.

According to yet another aspect of the subject matter described herein, the Diameter signaling message comprises an update location answer (ULA) and the IoT device information comprises a change of international mobile subscriber identity-international mobile equipment identifier (IMSI-IMEI) association.

According to yet another aspect of the subject matter described herein, using the IoT device information to automatically provision the IoT device information database includes extracting the IoT device information and an IoT device identifier from the Diameter message, determining that IoT device monitoring is enabled for the IoT device identified by the IoT device identifier, and creating or updating a record in the IoT device information database with the IoT device identifier and the IoT device information.

According to yet another aspect of the subject matter described herein, receiving the monitoring subscription request includes receiving the monitoring subscription request via a monitoring subscription interface of a SCEF of the combined SCEF and DSR.

According to yet another aspect of the subject matter described herein, using the IoT device information to respond to the monitoring subscription request includes responding from the combined DSR and SCEF without requesting the IoT device information from a mobility management entity/serving general packet radio service support node (MME/SGSN) or a home subscriber server (HSS).

A system for providing reduced signaling Internet of things (IoT) device monitoring includes a combined service capability exposure function (SCEF) and Diameter signaling router (DSR) including at least one processor. The combined SCEF and DSR includes an IoT device information database. The combined SCEF and DSR further includes a message copy function for receiving Diameter signaling containing IoT device information and copying the Diameter signaling. The combined SCEF and DSR further includes a SCEF for receiving the copy of the Diameter signaling and using the IoT device information to automatically provision the IoT device information database, receiving a monitoring subscription request, extracting the IoT device information from the IoT device information database, and using the IoT device information to respond to the monitoring subscription request.

According to another aspect of the subject matter described herein, the combined SCEF and DSR is configured to route the Diameter signaling to its destination.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
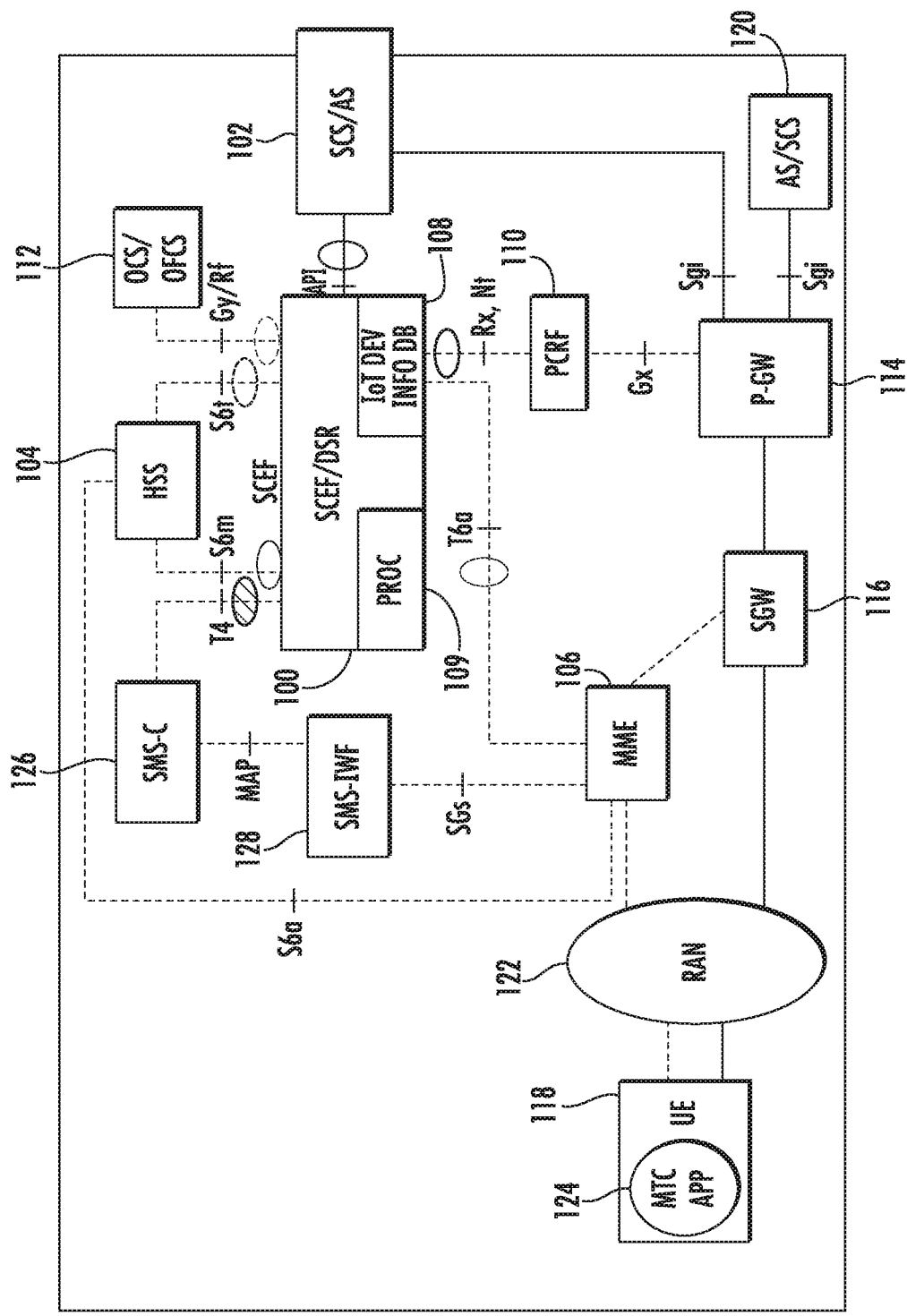
FIG. 1 is a network diagram illustrating exemplary network nodes associated with providing for reduced signaling IoT device monitoring.

The subject matter described herein relates to methods, systems, and computer readable media for providing reduced signaling IoT device monitoring. In particular, the subject matter described herein relates to reducing IoT device generated traffic to or from the HSS and to or from the MME when responding to a monitoring subscription request. The signaling is reduced over the conventional case in which the SCEF must contact the HSS and/or the MME to respond to a monitoring subscription request.

IoT provides various functionalities by which an SCS application server can access or monitor IoT devices. Specific IoT device parameters which can be monitored include:
    a.) Loss of connectivity of IoT device(s)
    b.) Reachability of IoT device(s)
    c.) Location of IoT device(s)
    d.) Change of international mobile station identity-international mobile equipment identifier (IMSI-IMEI) association and IMEI software version (IMEI-SV) of IoT device(s)

Monitoring each of these types of events involves signaling in the 3GPP network, which is also referred to as the public land mobile network (PLMN). The subject matter described herein automatically builds an IoT device information database that contains IoT device state information for each of the above-enumerated events and uses the database to respond to queries for IoT device state information.

As stated above, 3GPP defines a node called service capability exposure function (SCEF) that has the responsibility to connect the non-3GPP SCS application server to the 3GPP network in order to reach or monitor the IoT devices. The subject matter described herein provides for an enhanced SCEF that uses the intelligence of a Diameter signaling router (DSR) to reduce the IoT generated traffic in the core network, including, but not limited to the 4G or 5G core network. The DSR is responsible for routing of Diameter messages between core network nodes. Some of these messages contain data that is again transmitted as IoT signaling for IoT use cases. For example, location information is sent by the MME to the HSS in an Update-Location-Request (ULR) message and, using the IoT device information database described herein, can also be sent to the SCS or AS (via the SCEF) as location reports.

The subject matter described herein automatically builds the above-referenced IoT device information database in a combined SCEF and DSR node by inspecting Diameter messages being routed by the DSR, extracting IoT device information from the Diameter messages, and storing the IoT device information in the database, which is accessible by the SCEF function of the combined SCEF and DSR. The SCEF function of the combined SCEF and DSR then uses the IoT device information in the database to respond to monitoring subscription requests from the SCS application server without the need to re-signal the MME or the HSS to obtain the IoT device state information. Because the combined SCEF and DSR can respond to monitoring subscription requests using its internal database without contacting the HSS or the MME, signaling bandwidth in the core network is conserved.

FIG. 1 is a network diagram illustrating a combined SCEF and DSR 100 that implements SCEF functionality, DSR functionality, IoT device information database auto-provisioning functionality, and intelligent monitoring event response functionality. In FIG. 1, the SCEF functionality that may be implemented by combined SCEF and DSR 100 includes providing a means to securely expose the services and capabilities provided by 3GPP network interfaces. In the illustrated example, combined SCEF and DSR 100 interfaces with SCS/AS 102 via a 3GPP defined interface, which is referred to as the T8 interface. Combined SCEF and DSR 100 receives monitoring subscription request messages from SCS/AS 102 over the T8 interface and also provides IoT device information to SCS/AS 102 via the T8 interface. However, rather than querying HSS 104 or MME 106 to obtain IoT device information in response to the monitoring subscription request messages, combined SCEF and DSR 100 utilizes IoT device information learned via Diameter signaling and stored locally in IoT device information database 108 to respond to the monitoring event request messages. Examples of IoT device information that is learned by combined SCEF and DSR 100 will be described in detail below. SCEF and DSR 100 includes at least one processor 109 for implementing the operations performed by SCEF and DSR 100.

The ovals in FIG. 1 around the interfaces of SCEF and DSR 100 represent Diameter interfaces. Different line types or shading represent different Diameter interfaces (T6a, Rx, etc.).

In the illustrated example, combined SCEF and DSR 100 is connected to a policy and charging rules function (PCRF) 110 via an Rx or Nt interface and to an online charging system/offline charging system (OCS/OFCS) 112 via a Gy or Rf interface. PCRF 110 is the node the network that performs policy and charging functions. OCS/OFCS 112 performs online and offline charging functions based on a subscriber's network usage.

Also illustrated in FIG. 1 are the packet gateway (PGW) 114 and a signaling gateway (SGW) 116. PGW 114 and SGW 116 provide over the top data communications between a user device, such as user equipment (UE) 118, and core network elements, such as SCS/AS 120. If UE 118 is a wireless device, communications between UE 118 and SGW 116 may occur over radio access network (RAN) 122. In the illustrated example, UE 118 includes MTC application 124 that performs machine type communication functions. Thus, UE 118 configured with MTC application 124 may be an IoT device, such as a sensor, that communicates wirelessly with the core network. In order to obtain information regarding UE 118 configured with MTC application 124 an SCS or AS, such as SCS/AS 102, may query combined SCEF and DSR 100, which may respond, for the above-enumerated event types, with IoT device information using internal IoT device information database 108.

In a standalone MTC-IWF deployment, MTC-IWF functionality (e.g., T4 triggering) is made available to the SCS/AS via the Tsp interface (not illustrated in FIG. 1). In an alternate implementation, MTC-IWF functionality may be implemented by combined SCEF and DSR 100. FIG. 1 further illustrates a short message service-center (SMS-C) 126 and a short message service interworking function (SMS-IWF) 128 that perform functions relating to the delivery of SMS messages. SMS-C 126 and SMS-IWF 128 are shown for completeness in FIG. 1, but are not essential in explaining the subject matter described herein.

A DSR is a key functional element in a 4G-LTE network that provides real-time routing capabilities to ensure that messages are routed among the correct elements in a network. The DSR function of combined SCEF and DSR 100 implements DRA functionality as defined by 3GPP standards. The DRA was introduced by the 3GPP to address the increased Diameter signaling traffic and growing complexity of 4G LTE networks. The DRA routes Diameter messages between various core network nodes of LTE networks, such as MME 106, HSS 104, PGW 114, and PCRF 110. The DRA functionality performed by combined SCEF and DSR 100 includes routing Diameter signaling messages based on Diameter level information in the messages.

The SCEF is an individual key entity within the 3GPP architecture interacting with HSS 104 (3GPP), MME 106 (3GPP), and SCS-AS 102 (Non-3GPP). Combining the SCEF and DSR in a single functional entity and enhancing the combined node to create and use a database of IoT device information enables reduced signaling between MME 106, HSS 104 and the SCEF function of combined SCEF and DSR 100. Example call flows will be described in detail below.

MTC refers to direct communication between devices using any communications channel, including wired and wireless. Machine to machine communication can include communications between industrial instrumentation, such as enabling a sensor or meter to communicate the data it records (such as temperature, inventory level, etc.) to application software that can use it (for example, adjusting an industrial process based on temperature or placing orders to replenish inventory). More recent machine to machine communication has changed into a system of networks that transmits data to and receives data from personal appliances. The expansion of IP networks around the world has made machine to machine communication quicker and easier while using less power. However, without the subject matter described herein, traffic to and from IoT devices for the purpose of monitoring device state can overwhelm a network.

In FIG. 2, end-to-end communications between MTC application 124 in UE 118 and the MTC application, such as SCS/AS 102, in the external network use services provided by the 3GPP system, and optionally services provided by a services capability server (SCS). The MTC application in the external network is typically hosted by an AS and may make use of an SCS for additional value-added services. The 3GPP system provides transport, subscriber management, and other communication services, including various architectural enhancements motivated by, but not restricted to, MTC (e.g. control plane device triggering).

The SCS is an entity which connects to the 3GPP network to communicate with UEs used for MTC and the MTC-IWF and/or SCEF in the home PLMN (HPLMN). The SCS offers capabilities for use by one or multiple MTC Applications. A UE can host one or multiple MTC applications. The corresponding MTC applications in the external network are hosted on one or multiple ASs.

As stated above, the SCEF provides for service capability exposure that provides a means to securely expose the services and capabilities provided by 3GPP network interfaces. In standalone MTC-IWF deployment, MTC-IWF functionality (e.g., T4 triggering) is made available to the SCS/AS via the Tsp interface. In certain deployments, the MTC-IWF may be co-located with the SCEF in which case MTC-IWF functionality is exposed to the SCS/AS via T8 interface (i.e., API). In deployments where MTC-IWF is not co-located with SCEF, interactions between MTC-IWF and SCEF are left up to the implementation.

The SCEF provides a means for the discovery of the exposed services and capabilities. The SCEF also provides access to network capabilities through homogenous network application programming interfaces (APIs) defined over the T8 interface. The SCEF abstracts the services from the underlying 3GPP network interfaces and protocols.

The trusted domain covers entities that are protected by adequate network domain security. The entities and interfaces within the trusted domain may all be within one operator's control, or some may be controlled by a trusted business partner which has a trust relationship with the operator e.g. another operator or a 3rd party.

External entities (i.e., entities outside of the 3GPP system or network) access IoT device information through a 3GPP procedure referred to as the monitoring events procedure. The monitoring events procedure is intended for monitoring of specific events in 3GPP system and making such monitoring events information available via the SCEF. The monitoring events procedure allows the identification of the 3GPP network element suitable for configuring the specific events, event detection, and event reporting to authorized users, e.g., for use by applications or logging, etc. If such an event is detected, the network might be configured to perform special actions, e.g., limit the UE access.

Figure 2A:
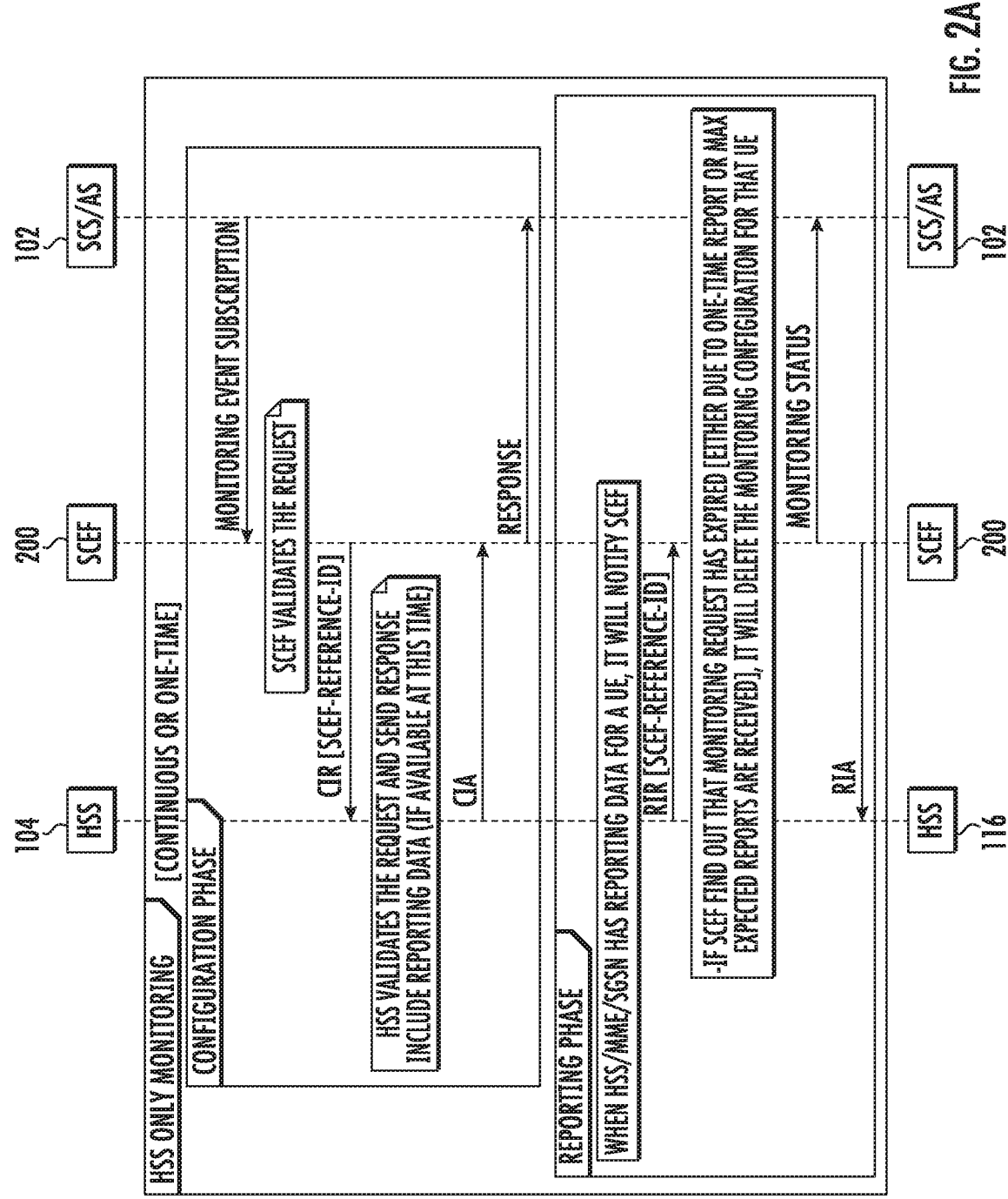
FIG. 2A is a call flow diagram illustrating exemplary signaling associated with 3GPP monitoring event subscription and reporting.
Figure 2B:
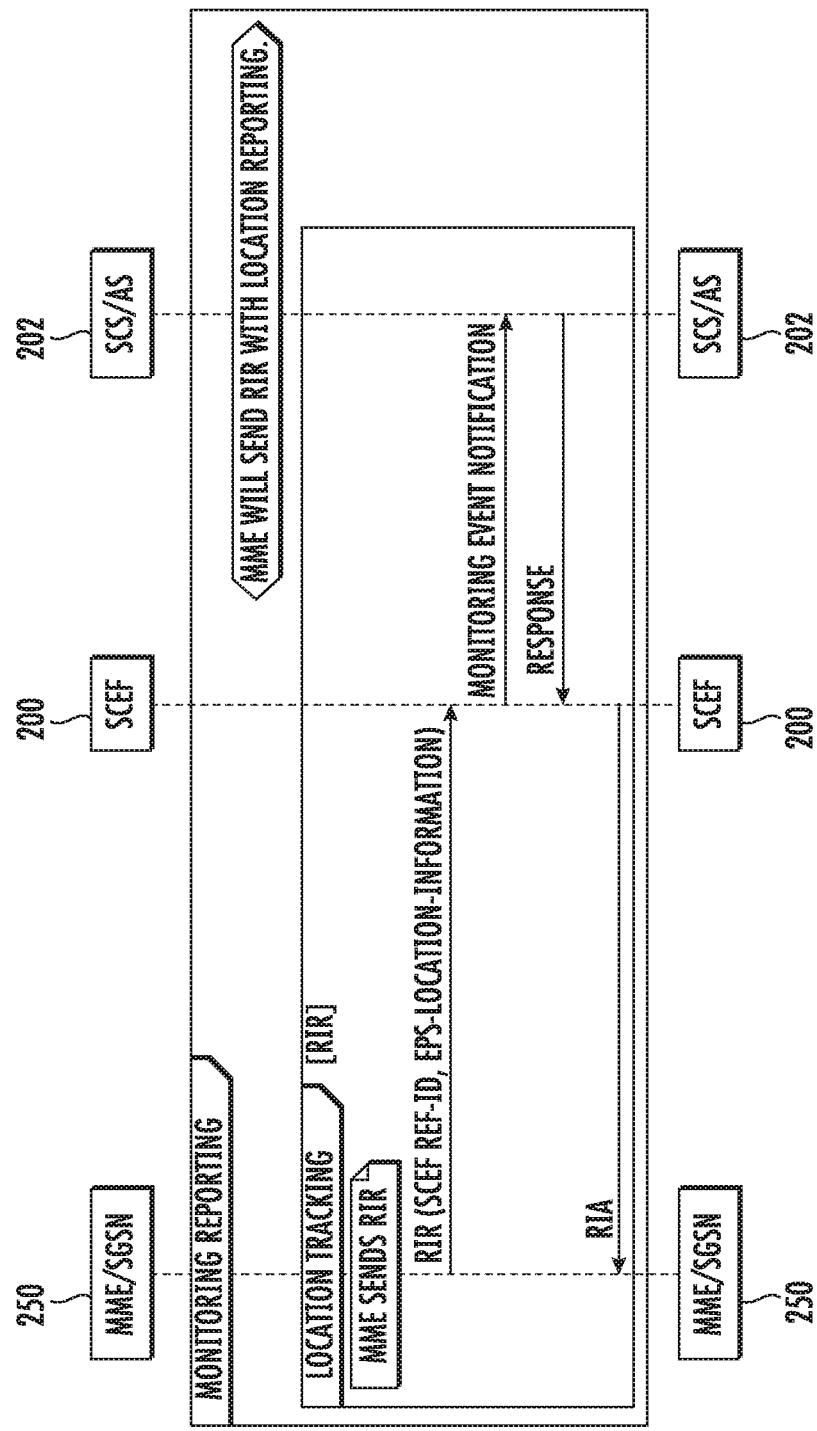
FIG. 2B is a call flow diagram illustrating reporting of a location event using 3GPP monitoring event reporting.

Monitoring Event Procedure without Enhanced SCEF and DSR with Auto-Provisioned IoT Device Information Database FIGS. 2A and 2B illustrate the 3GPP monitoring event procedure without the intelligent combined SCEF and DSR illustrated in FIG. 1. Referring to FIG. 2A, the top part of the diagram illustrates the configuration phase where SCS/AS 102 sends a monitoring event request to SCEF 200 to configure a new subscription to monitor an IoT device. The monitoring subscription request may include an external identifier or mobile subscriber integrated services digital network (MSISDN) number for identifying the IoT device whose event information is requested. The monitoring subscription request may also include the SCS/AS identifier, T8 transaction reference identifier (TTRI), T8 long term transaction reference ID (TLTRI), monitoring type, maximum number of reports, monitoring duration, T8 destination address, and group reporting guard time. SCEF 200 gives a higher precedence to the external identifier when both identifiers (external identifier and MSISDN) are present in the monitoring event configuration request message.

SCEF 200 validates the request and stores the SCS/AS identifier, T8 destination address, monitoring duration, and maximum number of reports. SCEF 200 also stores the received TLTRI and assigns the TLTRI to an SCEF reference ID.

SCEF 200 sends a monitoring request including the external identifier or MSISDN, SCEF ID, SCEF reference ID, monitoring type, maximum number of reports, monitoring duration) message to HSS 104 to configure the given monitoring event on HSS 104 in a configuration-information-request (CIR) message.

HSS 104 receives the CIR message, and, after processing the CIR message, sends a configuration-information-answer (CIA) message to the SCEF. Then according to the result code received in CIA message, SCEF 200 sends a response to SCS/AS 102. If the result code is Success (201), SCEF 200 sends a monitoring response (TTRI, Cause, Monitoring Event Report) message to SCS/AS 102 to acknowledge acceptance of the monitoring request. If the result code is not success, then an appropriate error result code is used to inform SCS/AS 102 about the error that occurred. Once SCS/AS 102 receives a response indicating success, the configuration phase of the monitoring event procedure ends.

The bottom portion of FIG. 2A illustrates the reporting phase of the monitoring event procedure where the node in the 3GPP network that has IoT device information notifies the SCEF. In this example, it is assumed that HSS 104 has the IoT device information corresponding to the monitoring subscription request. Accordingly, HSS 104 sends a routing information request (RIR) message with including the SCEF reference ID and the requested IoT device information to SCEF 200. SCEF 200 provides the IoT device information to SCS/AS 102. SCEF 200 also sends a rouging information answer (RIA) message to HSS 104 acknowledging receipt of the RIR message. If SCEF 200 determines that the monitoring event request has expired, either for one time monitoring or due to the maximum expected number of being received, SCEF 200 deletes the monitoring event configuration for the UE.

FIG. 2A illustrates the case of HSS only monitoring, where HSS 104 includes the requested IoT device information. The result of this type of monitoring is signaling between HSS 104 and SCEF 200 to obtain the IoT device information. In FIG. 2A, this signaling is represented by the CIR, CIA, RIR, and RIA messages. Due to the high number of IoT devices, exchanging these four messages for every IoT device information report can be burdensome on the 3GPP network.

In another example the requested IoT device information many not reside in the HSS and signaling with additional 3GPP network nodes may be required. may reside in another node in the 3GPP network. One such example is illustrated in FIG. 2B. In FIG. 2B, MME/SGSN 250 may have location information regarding an IoT device. In FIG. 2B, the monitoring event configuration phase is omitted and only the reporting phase is shown. Referring to FIG. 2B, when MME/SGSN 250 has location information regarding an IoT device for which MME/SGSN 250 has received a monitoring event subscription, MME/SGSN 250 sends an RIR message including the location information to SCEF 200. SCEF 200 provides the location information to SCS/AS 102 in a monitoring event notification message send to SCS/AS 102 over the T8 interface. SCS/AS 102 response to SCEF 200 indicating successful receipt of the monitoring event notification message. After receiving the response, SCEF 200 sends an RIA message to MME/SGSN 250.

Thus, in the example illustrated in FIG. 2B, signaling between SCEF 200 and MME/SGSN 250 is required to obtain the requested IoT device information. This signaling includes the RIR and RIA messages exchanged between SCEF 200 and MME/SGSN 250. In anther example, where the HSS does not have the requested monitoring event information, the HSS may contact the MME for the requested information, the MME will provide the information to the HSS, and the HSS will provide the information to the SCEF, resulting in even more signaling in the 3GPP network.

In order to avoid these difficulties for the following types of information, the SCEF will not signal the HSS, MME or SGSN to obtain the required information and will instead use information stored in its local automatically provisioned database of IoT device information to respond to monitoring event subscriptions for IoT device state.

Providing for Reduced Signaling IoT Device Monitoring Using Combined SCEF and DSR with Automatically Provisioned IoT Device Information Database Using IoT device information database 108, the SCEF function of combined SCEF and DSR 100 will not initiate a CIR message towards HSS 104 to obtain IoT device information. Instead, the SCEF function will use the IoT device information in database 108 to provide IoT device information to SCS/AS 102. IoT device information database 108 will be built or provisioned as soon as an IoT device is switched on and any updates occur. When an IoT device update occurs, core network Diameter messages will be exchanged between MME 106 and HSS 108 via the DSR function of combined SCEF and DSR 100. Combined SCEF and DSR 100 will receive these messages, parse the messages to extract IoT device information, and use the information to populate IoT device information database 108. When combined SCEF and DSR 100 receives a monitoring subscription request from SCS/AS 102, The SCEF function of combined SCEF and DSR 100 will respond to the monitoring subscription request using the IoT device information stored in IoT device information database 108. If the requested IoT device information is not present in database 108, the SCEF function of combined SCEF and DSR 100 will utilize the existing call flows illustrated in FIGS. 2A and 2B to obtain the IoT device information and provide the IoT device information to SCS/AS 102.

Figure 3:
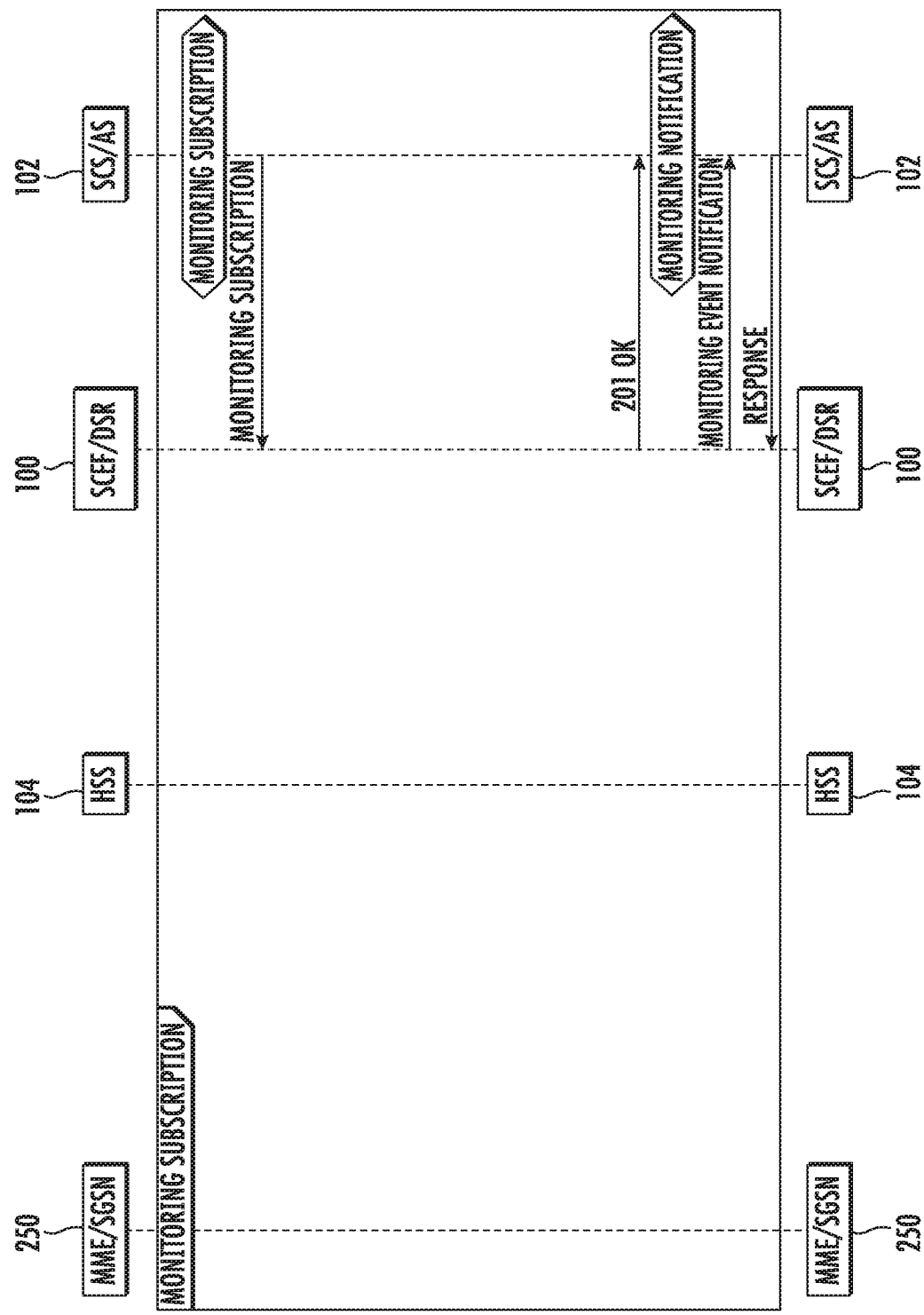
FIG. 3 is a diagram illustrating the providing of reduced signaling IoT device monitoring using a combined SCEF and DSR with an automatically provisioned IoT device information database.

FIG. 3 is a call flow diagram illustrating the reduced signaling that occurs for the case where the requested IoT device information is present in IoT device information database 108. Referring to FIG. 3, in the first line of the message flow, SCS/AS 102 sends a monitoring subscription request message to combined SCEF and DSR 100. The monitoring subscription request may request monitoring state information of an IoT device. Rather than sending a CIR message to HSS 104 to obtain the requested IoT device information, combined SCEF and DSR 100 accesses its internal IoT device information database that was constructed using information extracted from Diameter messages that are transmitted for reasons unrelated to monitoring event messaging, determines that the requested IoT device information is present in database 108, and response to the monitoring subscription request message with a monitoring event notification message containing the requested IoT device information.

The X marks in FIG. 3 illustrate the messages that are not required to be transmitted when database 108 contains the requested monitoring event information. The messages that are not required to be transmitted include the CIR message from SCEF and DSR 100 to HSS 104, the insert subscriber data request (IDR) message from HSS 104 to MME/SGSN 205, the CIA message from HSS 104 to combined SCEF and DSR 100, the RIR from HSS 104 to SCEF and DSR 100, the RIA message from SCEF and DSR 100 to HSS 104, the RIR from MME/SGSN 250 to SCEF and DSR 100, and the RIA from SCEF and DSR 100 to MME/SGSN 250. Thus, in the example message flow illustrated in FIG. 3, a total of eight messages are not required to be transmitted among 3GPP core network nodes, thus reducing signaling traffic in the core network.

As stated above, combined SCEF and DSR 100 may use information extracted from Diameter messages transmitted because of IoT device events to populate IoT device information database 108. The following are examples of types of messages that SCEF and DSR 100 may utilize to obtain IoT device information.

Mapping of Monitoring Events with Core Mobility Service Messages a.) Loss of Connectivity of Device The purge UE procedure is used between the MME and the HSS and between the SGSN and the HSS to indicate that the subscriber's profile has been deleted from the MME or SGSN either by a man-machine interface (MMI) interaction or automatically, Purge UE Request

TABLE 1

Purge UE Request Information Elements and Mappings to Diameter AVPs

| Information element name | Mapping to Diameter AVP | Cat. | Description |
|---|---|---|---|
| IMSI | User-Name (See IETF RFC 6733) | M | This information element shall contain user IMSI, formatted according to 3GPP TS 23.003, clause 2.2. |
| Supported Features (See 3GPP TS 29.229) | Supported-Features | O | If present, this information element shall contain the list of features supported by the origin host. |
| PUR-Flags (See 7.3.149) | PUR-Flags | O | If present, this Information Element shall contain a bitmask. See section 7.3.149 for the meaning of the bits. |
| EPS-Location-Information (See 7.3.111) | EPS-Location-Information | C | This Information Element shall contain the last known EPS-Location Information of the purged UE. Shall be present if available. |

If there is an optional parameter "maximum detection time" specified in a monitoring subscription request, then monitoring event functionally will fall back to existing functionality, as illustrated in FIGS. 2A and 2B.

From Table 1, the purge UE request (PUR) is sent from the MME or SGSN to the HSS to delete UE's record from the HSS. The purge UE information includes location information for the UE and the fact that the purge UE message is being sent may indicate loss of connectivity of the UE. Accordingly, when SCEF and DSR 100 receives a purge UE request message. SCEF and DSR 100 may add the UE (IoT device) identified by the IMSI in the message to IoT device information database 108 along with the last known location of the UE and the fact that connection with the UE has been lost.

b.) Reachability of Device

Another event that combined SCEF and DSR 100 may utilize to automatically populate IoT device information database 108 is the Diameter notify request/notify answer procedure transmitted between the MME or SGSN and the HSS requests to be notified when the UE is reachable.

UE reachability is requested by the HSS via the notify request (NOR) message. UE reachability is provided by the MME or SGSN via the notify answer (NOA). Accordingly, when combined SCEF and DSR 100 receives an NOA message with UE reachability information, combined SCEF and DSR 100 may create an entry for the UE identified in the NOA message in database 108 and may add information to the entry indicating that the UE is reachable via the responding MME or SGSN.

c.) Location of Device

Yet another type of event that combined SCEF and DSR 100 may utilize to obtain IoT device information is an update location or insert subscribe data event for obtaining subscriber location information. Subscriber location information may be provided by the MME or SGSN in an update location request (ULR) message or an insert subscriber data answer (IDA) message. The update location procedure is used between the MME and the HSS and between the SGSN and the HSS to update location information in the HSS. The procedure is invoked by the MME or SGSN and is used:

to inform the HSS about the identity of the MME or SGSN currently serving the user, and optionally in addition;

to update MME or SGSN with user subscription data; subscription data that are applicable to MMEs but not to SGSNs should not be sent to the SGSN unless the SGSN is known to be a combined MME/SGSN; similarly, subscription data that are applicable to SGSNs but not to MMEs should not be sent to the MME unless the MME is known to be a combined MME/SGSN.

to provide the HSS with other user data, such as Terminal Information or UE SRVCC Capability.

IDR/IDA

The insert subscriber data procedure is used between the HSS and the MME and between the HSS and the SGSN for updating and/or requesting certain user data in the MME or SGSN. Combined SCEF and DSR 100 may, in response to receiving an IDA message from an MME or SGSN, extract IoT device information from the IDA message and store the data in database 108.

d.) Change of IMSI-IMEI Association and IMEI-SV

Yet another type of IoT device information that may be obtained by combined SCEF and DSR 100 and stored in IoT device information database 108 is IoT IMSI-IMEI association of an IoT device and a change in such association. A change in IMSI-IMEI association may be accomplished by a ULR/ULA message exchange between the MME or SGSN and the HSS. The update location procedure is used between the MME and the HSS and between the SGSN and the HSS to update location information in the HSS. The procedure is invoked by the MME or SGSN and is used to provide the HSS with other user data, such as terminal information or UE SRVCC capability. The ULA message contains a terminal information attribute value pair (AVP), which is of type grouped. The terminal information AVP contains the following information about the UE:

```
Terminal-Information ::= <AVP header: 1401 10415>
[ IMEI ]
[ 3GPP2-MEID ]
[ Software-Version ]
*[ AVP ]
```

When combined SCEF and DSR 100 receives an update location answer message with a terminal information AVP, combined SCEF and DSR 100 may extract the IMEI from the AVP and create or add to a record in database 108 containing the association between the IMEI and the IMSI.

Figure 4:
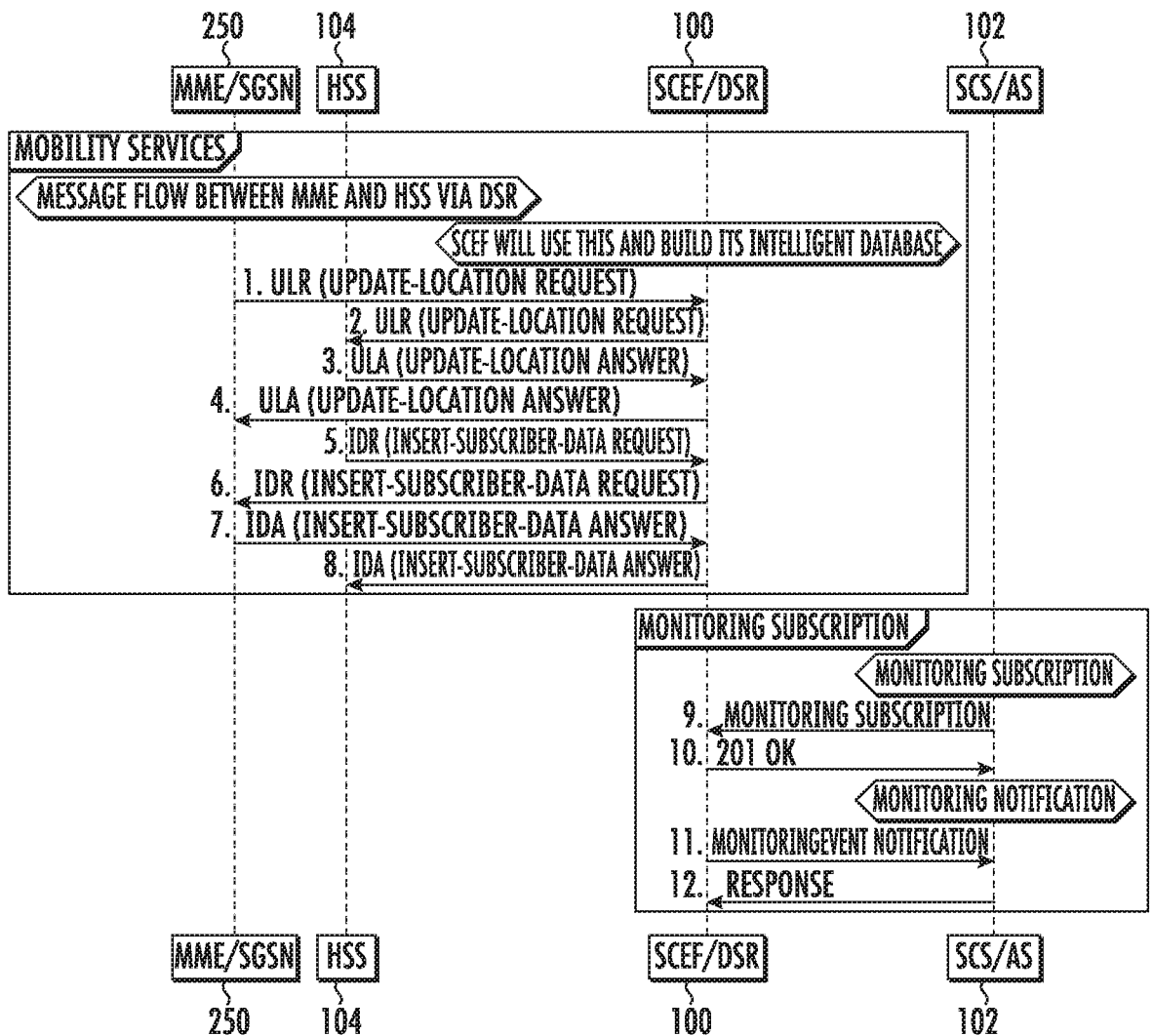
FIG. 4 is a call flow diagram illustrating signaling associated with automatically provisioning the IoT device information database and the use of the database to respond to a monitoring subscription request.

FIG. 4 is a call flow diagram illustrating the automatic provisioning of IoT device information database 108 using information extracted from Diameter signaling messages and the use of the information in IoT device information database 108 to provide IoT device information to SCS/AS 102 in response to a monitoring event subscription request. Referring to FIG. 4, in line 1, when an IoT device newly registers at MME/SGSN 250, MME/SGSN 250 sends an update location request to HSS 104 via the DSR function of combined SCEF and DSR 100. In line 2, the DSR function of combined SCEF and DSR 100 routes the update location request message to HSS 104.

In addition to routing the update location request message to HSS 104, the DSR function of combined SCEF and DSR 100 may identify the message as being of a type that contains IoT device information and that concerns an IoT device configured in database 108 for IoT device monitoring. As will be described in detail below, a network operator may configure the identities of IoT devices in database 108 for which monitoring is required. In addition, when combined SCEF and DSR 100 receives a monitoring subscription request for monitoring an IoT device whose identity is not present in database 108 at the time of the monitoring event subscription, combined SCEF and DSR 100 may add the identity of the IoT device to database 108 and populate database 108 with IoT device information obtained from the MME and/or HSS in response to the monitoring event subscription. In this example, it is assumed that the IoT device identified in the update location request message is configured for monitoring in database 108. Accordingly, combined SCEF and DSR 100 may parse the location update request message, extract subscriber location information from the message, and store the subscriber location information in database 108.

Returning to the message flow in FIG. 4, in line 3, HSS 104 sends an update location answer message to combined SCEF and DSR 100. In line 4, combined SCEF and DSR 100 routes the update location answer message to HSS 104.

In line 5 if the message flow diagram, HSS 104 sends an insert subscriber data request message to combined SCEF and DSR 100. In line 6, combined SCEF and DSR 100 routes the insert subscriber data request message to MME/SGSN 250. In line 7 of the message flow diagram, MME/SGSN 250 sends an insert subscriber data answer message to combined SCEF and DSR 100. In line 8 of the message flow diagram, combined SCEF and DSR 100 routes the insert subscriber data answer message to HSS 104.

In response to receiving the insert subscriber data answer message in line 7, combined SCEF and DSR 100 may recognize the message as being of a type that contains IoT device information of interest and that concerns an IoT device configured for monitoring in database 108. Accordingly, SCEF and DSR 100 may parse the insert subscriber data answer message, extract IoT device information from the insert subscriber data answer message ands store the IoT device information in database 108.

In line 9 of the message flow diagram, SCS/AS 102 sends a monitoring event subscription request to combined SCEF and DSR 100. In line 10 of the message flow diagram, combined SCEF and DSR 100 responds to the monitoring event notification request with a 201 OK message. In line 11 of the message flow diagram, combined SCEF and DSR 100 sends a monitoring event notification message to SCS/AS 102. The monitoring event notification message contains IoT device information of the type and for the IoT device identified in the monitoring subscription request message. The IoT device information in the monitoring event notification message is obtained by combined SCEF and DSR 100 from its internal database 108. In line 12 of the message flow diagram, SCS/AS 102 response to the monitoring event notification message acknowledging receipt.

Configuration

The network operator can configure any one or more of the IMSI, External-ID, and/or MSISDN in database 108 in the combined SCEF and DSR 100 to identify each IoT device for which monitoring needs to be enabled. The operator may also configure the type of monitoring, duration of monitoring and number of reports for each IoT device or on a group basis.

Other Considerations

In one exemplary implementation, the duration for which each IoT device data entry is to be maintained in database 108 may be configurable by the network operator with a default value, such as 1 week. Upon expiration of the specified or default duration, combined SCEF and DSR 100 may remove the information from database 108

Combined SCEF and DSR 100 may delete records in database 108 in response to a PUR/PUA message exchange.

Combined SCEF and DSR 100 may update records in database when any of the above-described message types are exchanged. If a UE is added to database 108 for monitoring configuration and a monitoring subscription request is received before data is populated for the UE in database 108, then a fallback to the monitoring event procedure illustrated in FIGS. 2A and 2B may occur.

Figure 5:
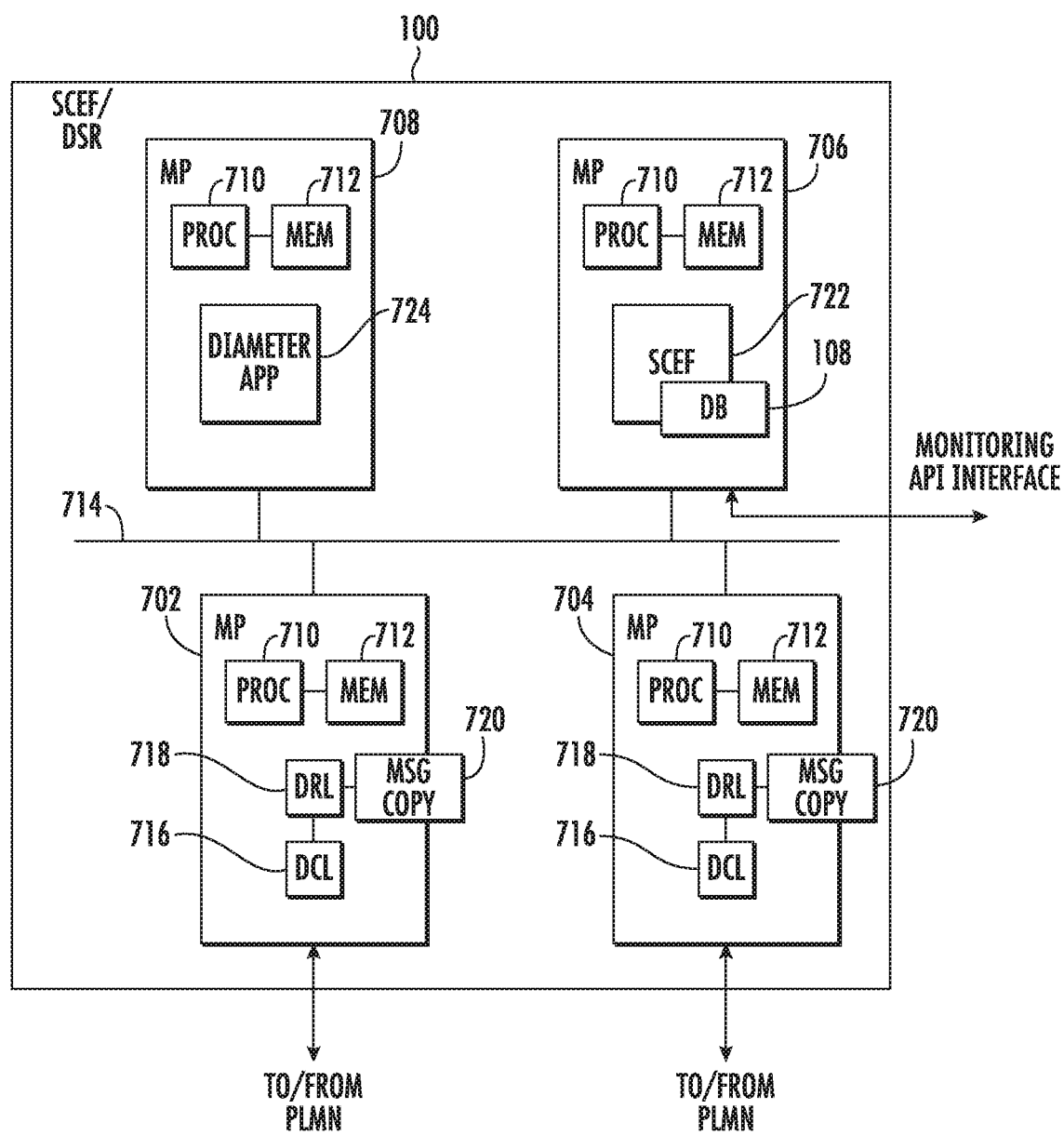
FIG. 5 is a block diagram of an exemplary architecture for a combined SCEF and DSR with IoT device auto-provisioning functionality.

FIG. 5 is a block diagram of an exemplary architecture for combined SCEF and DSR 100. Referring to FIG. 5, combined SCEF and DSR 100 includes a plurality of message processors 702, 704, 706, and 708. Each message processor 702, 704, 706, and 708 includes a printed circuit board and at least one processor 710 and memory 712 mounted on the printed circuit board. Message processors 702, 704, 706, and 708 may exchange messages via a communications medium 714, such as an Ethernet backplane.

In the illustrated example, message processors 702 and 704 each implement DSR functionality. As such, each may include a Diameter connection layer 716 and a Diameter routing layer 718. Diameter connection layer 716 establishes and maintains Diameter connections with peer Diameter nodes. Diameter routing layer 718 routes Diameter messages based on Diameter layer information, such as destination host and destination realm parameters, in the messages. Message processors 702 and 704 may also implement a message copy function 720 that copies messages that contain IoT device information of interest to message processor 706, which implements SCEF functionality and IoT device information database auto-provisioning functionality.

Message processor 706 implements SCEF 722 with and IoT device information database auto-provisioning functionality for automatically provisioning IoT device information database 108, which may also reside on message processor 706. SCEF 722 may receive Diameter messages copied by message copy functions 720, determine whether the messages concern IoT devices for which monitoring is enabled, and, in response, parsing the messages and storing the IoT device information in database 108. SCEF 722 may also receive monitoring event subscription messages via a monitoring API interface, such as a T8 interface, and use the information provisioned in database 108 to respond to the monitoring event subscription messages.

Message processor 708 implements a Diameter application 724. Diameter application 724 may be any suitable Diameter application, such as a Diameter firewall application or a performance monitoring application.

In the example illustrated in FIG. 5, the SCEF and DSR functions are implemented on separate message processors. In an alternate implementation, the SCEF and DSR functions may be implemented on the same message processor.

Figure 6:
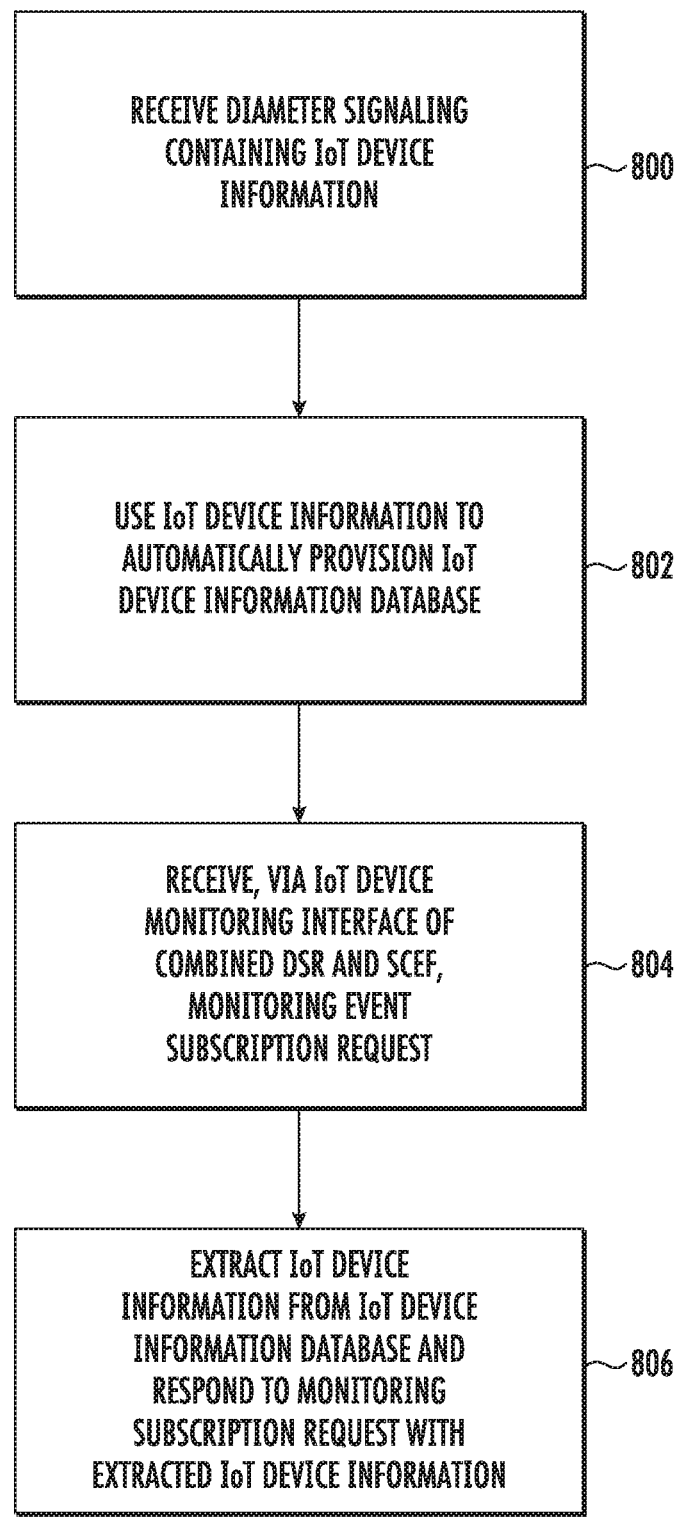
FIG. 6 is a flow chart illustrating an exemplary process for providing for providing reduced signaling IoT device monitoring.

FIG. 6 is a flow chart illustrating an exemplary process for automatically provisioning an IoT device information database with IoT device information obtained from Diameter messages and for using the database to respond to monitoring subscription requests. Referring to FIG. 6, the process includes steps performed in a combined Diameter signaling router (DSR) and service capability exposure function (SCEF) including at least one processor. In step 800, the method includes receiving Diameter signaling containing IoT device information. For example, combined SCEF and DSR 100 may receive an update location request, a notification answer, a purge user request, or an insert subscriber data answer message transmitted between an SGSN/MME and an HSS.

In step 802, the process includes using the IoT device information to automatically provision an IoT device information database. For example, combined SCEF and DSR 100 may receive one of the message types listed in the preceding paragraph, the DSR function may route the received message to its destination and send a copy of the message to the SCEF function. The SCEF function may parse the message, extract the IoT device identifier from the message, determine that the IoT device is one for which monitoring is enabled, and store the IoT device information from the message in IoT device information database 108. The types of IoT device information that may be provisioned include loss of IoT device connectivity extracted from a PUR message, device reachability from an NOA message, device location from an ULR or IDA message, and change of IMSI-IMEI associate from a ULA message.

In step 804, the process includes, receiving, via an IoT monitoring subscription interface of the combined SCEF and DSR, a monitoring subscription request. For example, the SCEF function of combined SCEF and DSR 100 may receive a monitoring subscription request from SCS/AS 102 via the T8 interface. The monitoring event request may include an IoT device identifier, specify a type of monitoring requested (e.g., location monitoring), and include a duration of the monitoring.

In step 806, the process includes extracting the IoT device information from the IoT device information database and using the extracted information to respond to the monitoring subscription request. For example, the SCEF function of combined SCEF and DSR 100 may use the IoT device identifier extracted from the monitoring subscription request to perform a lookup in IoT device information database 108. If the result of the lookup is a match, the SCEF function may extract the requested monitoring information from database 108, formulate a monitoring subscription response message, insert the requested IoT device information in the monitoring event response message, and forward the monitoring event response message to the requested SCS or AS.

If there is no match or if there is a matching entry, but the requested information is not in database 108, the SCEF function may use the monitoring event procedures illustrated in FIGS. 2A and 2B to obtain the requested monitoring information.

Exemplary Advantages

The combined SCEF and DSR with IoT device information database auto-provisioning and reduced signaling monitoring event response capabilities may provide one or more of the following advantages:

a.) Significantly decreases IoT traffic in the core network between the SCEF and the MME/HSS for IoT.

b.) Provides details of IoT monitoring data to the application server without requiring direct communication between MME/HSS and AS.

c.) Allows mobile network operators to provide value added services such as location tracking, reachability status, loss of connectivity, IMEI change, etc.

d.) Allows subscriber level granularity for enabling this optimization providing finer control to the mobile network operator.

e.) Decreases turnaround time for IoT signaling because data will be already available in combined SCEF and DSR 100.

f.) Enables the SCS application server to present a dashboard for IoT devices without having to register for each device. This is achieved by configuration at the combined SCEF and DSR, thereby relieving the SCS from having to register for each IoT device.

The disclosure of each of the following references is incorporated herein by reference in its entirety.

REFERENCES (1) 3GPP TS 29.122, Technical Specification Group Core Network and Terminals; T8 reference point for Northbound APIs; (Release 16) V16.1.0 (March 2019)
(2) 3GPP TS 29.336, Technical Specification Group Core Network and Terminals; Home Subscriber Server (HSS) diameter interfaces for interworking with packet data networks and applications (Release 15) V15.6.0 (March 2019)
(3) 3GPP TS 23.682, Technical Specification Group Services and System Aspects; Architecture enhancements to facilitate communications with packet data networks and applications (Release 16), V16.2.0 (March 2019).
(4) 3GPP TS 29.272—Technical Specification Group Core Network and Terminals; Evolved Packet System (EPS); Mobility Management Entity (MME) and Serving GPRS Support Node (SGSN) related interfaces based on Diameter Protocol (Release 15), V15.7.0, (March 2019).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing reduced signaling Internet of things (IoT) device monitoring, the method comprising:
   in a combined service capability exposure function (SCEF) and Diameter signaling router (DSR) including at least one message processor that implements a Diameter routing layer that routes Diameter messages based on Diameter layer information in the messages:
   receiving Diameter signaling containing IoT device information;
   using the IoT device information to automatically provision an IoT device information database;
   receiving a monitoring subscription request from a service capability server (SCS) or an application server (AS);
   extracting the IoT device information from the IoT device information database; and
   using the IoT device information to respond to the monitoring subscription request, wherein using the IoT device information to respond to the monitoring subscription request includes responding directly from the combined SCEF and DSR to the SCS or AS without requesting the IoT device information from a mobility management entity/serving general packet radio service support node (MME/SGSN) or a home subscriber server (HSS).

2. The method of claim 1 wherein receiving Diameter signaling includes receiving a Diameter signaling message transmitted between the MME/SGSN and the HSS separately from monitoring event signaling.

3. The method of claim 2 wherein the Diameter signaling message comprises a purge UE request (PUR) and the IoT device information comprises loss of device connectivity.

4. The method of claim 2 wherein the Diameter signaling message comprise a notification answer (NOA) message and the IoT device information comprise device reachability.

5. The method of claim 2 wherein the Diameter signaling message comprises an update location request (ULR) or an insert subscriber data answer (IDA) and the IoT device information comprises device location.

6. The method of claim 2 wherein the Diameter signaling message comprises an update location answer (ULA) and the IoT device information comprises a change of international mobile subscriber identity-international mobile equipment identifier (IMSI-IMEI) association.

7. The method of claim 2 wherein using the IoT device information to automatically provision the IoT device information database includes extracting the IoT device information and an IoT device identifier from the Diameter signaling message, determining that IoT device monitoring is enabled for the IoT device identified by the IoT device identifier, and creating or updating a record in the IoT device information database with the IoT device identifier and the IoT device information.

8. The method of claim 1 wherein receiving the monitoring subscription request includes receiving the monitoring subscription request via a monitoring subscription interface of an SCEF of the combined SCEF and DSR.

9. A system for providing reduced signaling Internet of things (IoT) device monitoring, the system comprising:
   a combined service capability exposure function (SCEF) and Diameter signaling router (DSR) including at least one message processor that implements a Diameter routing layer that routes Diameter messages based on Diameter layer information in the messages, the combined SCEF and DSR further including:
   an IoT device information database;
   a message copy function for receiving Diameter signaling containing IoT device information and copying the Diameter signaling; and
   an SCEF for receiving the copy of the Diameter signaling and using the IoT device information to automatically provision the IoT device information database, receiving a monitoring subscription request, extracting the IoT device information from the IoT device information database, and using the IoT device information to respond to the monitoring subscription request, wherein using the IoT device information to respond to the monitoring subscription request includes responding directly from the combined SCEF and DSR to the SCS or AS without requesting the IoT device information from a mobility management entity/serving general packet radio service support node (MME/SGSN) or a home subscriber server (HSS).

10. The system of claim 9 wherein receiving Diameter signaling includes receiving a Diameter signaling message transmitted between the MME/SGSN and the HSS separately from monitoring event signaling.

11. The system of claim 10 wherein the Diameter signaling message comprises a purge UE request (PUR) and the IoT device information comprises loss of device connectivity.

12. The system of claim 10 wherein the Diameter signaling message comprise a notification answer (NOA) message and the IoT device information comprise device reachability.

13. The system of claim 10 wherein the Diameter signaling message comprises an update location request (ULR) or an insert subscriber data answer (IDA) and the IoT device information comprises device location.

14. The system of claim 10 wherein the Diameter signaling message comprises an update location answer (ULA) and the IoT device information comprises a change of international mobile subscriber identity-international mobile equipment identifier (IMSI-IMEI) association.

15. The system of claim 10 wherein using the IoT device information to automatically provision the IoT device information database includes extracting the IoT device information and an IoT device identifier from the Diameter signaling message, determining that IoT device monitoring is enabled for the IoT device identified by the IoT device identifier, and creating or updating a record in the IoT device information database with the IoT device identifier and the IoT device information.

16. The system of claim 9 wherein receiving the monitoring subscription request includes receiving the monitoring subscription request via a monitoring subscription interface of the SCEF.

17. The system of claim 9 wherein the combined SCEF and DSR is configured to route the Diameter signaling to its destination.

18. A non-transitory computer readable medium having stored thereon executable instructions that when executed by a processor of a computer control the computer to perform steps comprising:

in a combined service capability exposure function (SCEF) and Diameter signaling router (DSR) including at least one message processor that implements a Diameter routing layer that routes Diameter messages based on Diameter layer information in the messages:
  receiving Diameter signaling containing Internet of things (IoT) device information;
  using the IoT device information to automatically provision an IoT device information database;
  receiving a monitoring subscription request;
  extracting the IoT device information from the IoT device information database; and
  using the IoT device information to respond to the monitoring subscription request, wherein using the IoT device information to respond to the monitoring subscription request includes responding directly from the combined SCEF and DSR to the SCS or AS without requesting the IoT device information from a mobility management entity/serving general packet radio service support node (MME/SGSN) or a home subscriber server (HSS).

* * * * *